United States Patent
Tanaka et al.

(10) Patent No.: US 11,934,030 B2
(45) Date of Patent: Mar. 19, 2024

(54) OPTICAL LENS, IMAGING MODULE AND ASSEMBLY METHOD THEREOF

(71) Applicant: NINGBO SUNNY OPOTECH CO., LTD., Yuyao (CN)

(72) Inventors: Takehiko Tanaka, Yuyao (CN); Heng Jiang, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 564 days.

(21) Appl. No.: 17/179,887

(22) Filed: Feb. 19, 2021

(65) Prior Publication Data

US 2021/0173169 A1   Jun. 10, 2021

Related U.S. Application Data

(63) Continuation of application No. PCT/CN2019/096346, filed on Jul. 17, 2019.

(30) Foreign Application Priority Data

Aug. 21, 2018 (CN) .......................... 201810953775.9

(51) Int. Cl.
*G02B 7/02* (2021.01)
*G02B 7/00* (2021.01)
*G02B 13/18* (2006.01)

(52) U.S. Cl.
CPC ............. *G02B 7/025* (2013.01); *G02B 7/003* (2013.01); *G02B 7/021* (2013.01); *G02B 13/18* (2013.01)

(58) Field of Classification Search
CPC ........ G02B 7/025; G02B 7/003; G02B 7/021; G02B 13/18
USPC .......................................................... 359/819
See application file for complete search history.

(56) References Cited

U.S. PATENT DOCUMENTS

2012/0200946 A1   8/2012   Wippermann et al.

FOREIGN PATENT DOCUMENTS

| CN | 101443687 A | 5/2009 |
|---|---|---|
| CN | 207067513 U | 3/2018 |
| CN | 207249220 U | 4/2018 |
| CN | 108121043 A | 6/2018 |

(Continued)

OTHER PUBLICATIONS

European Search Report issued in corresponding EP Application No. 19850897.0; dated Aug. 27, 2021; 6 pgs.

(Continued)

*Primary Examiner* — Joseph P Martinez
*Assistant Examiner* — Grant A Gagnon
(74) *Attorney, Agent, or Firm* — HAUPTMAN HAM, LLP

(57) ABSTRACT

The present disclosure provides an optical lens, which includes a first lens member, a second lens member and a first adhesive. The first lens member includes at least one first lens. The second lens member includes a second lens barrel and at least one second lens mounted in the second lens barrel. The at least one second lens and the at least one first lens together forms an imaging optical system. The second lens member has a second optical region and a second structural region surrounding the second optical region. The second structural region has a second top surface and the second top surface has a groove. The first adhesive locates in a first gap between the first lens member and the second lens member, and the first adhesive is accommodated in the groove. The first adhesive is adapted to flow in the groove when uncured.

14 Claims, 5 Drawing Sheets

(56) References Cited

FOREIGN PATENT DOCUMENTS

EP 1850161 A1 10/2007
KR 20140076761 A 6/2014

OTHER PUBLICATIONS

International Search Report issued in corresponding International Application No. PCT/CN2019/096346; dated Oct. 22, 2019; State Intellectual Property Office of the P.R. China, Beijing, China, 6 pgs.

OPTICAL LENS, IMAGING MODULE AND ASSEMBLY METHOD THEREOF

CROSS-REFERENCE TO RELATED APPLICATIONS

The present patent application is a continuation of International Application No. PCT/CN2019/096346, filed on Jul. 17, 2019, which claims benefit of priority to Chinese Patent Application No. 201810953775.9, entitled "Optical Len, Camera Module, and Assembly Method Thereof", filed before the China National Intellectual Property Administration (CNIPA) on Aug. 21, 2018. Both of the aforementioned patent applications are hereby incorporated by reference in their entireties.

TECHNICAL FIELD

The present disclosure relates to the technical field of optical imaging, and more particularly, to an optical lens, an imaging module, and an assembly method thereof.

BACKGROUND

With the popularization of mobile electronic devices, the related technologies of camera modules applicable to mobile electronic devices and for assisting a user to acquire images (such as videos or images) have been rapidly developed and advanced. In recent years, the camera module has been widely used in many fields such as medical treatment, security, industrial production, and the like.

In order to meet the increasing market demand, high pixel, small size, and large aperture are irreversible development trends for the current camera modules. However, it is difficult to achieve high pixel, small size, and large aperture requirements in a same camera module. For example, the compactness requirement of the mobile phone and the increase in screen-to-body ratio have made the space inside the mobile phone available for the front camera module smaller and smaller. In addition, the market has put forward higher and higher demands for the imaging quality of camera modules.

In compact camera modules (for example, camera modules for mobile phones), a lens is an important part of the camera module and directly affects the imaging quality of the camera module.

In a multi-group lens, the lens members are actively calibrated and connected using glue to form a complete optical system. A conventional method of assembling a multi-group lens is to actively adjust an upper lens member and a lower lens member, determine a relative position of the upper lens member, remove the upper lens member, then coat an adhesive on the surface of the lower lens member, move the upper lens member back, and cure the adhesive so that the upper lens member and the lower lens member are adhered together.

In this assembly mode, in order to coat the adhesive, the upper lens member must be removed, so that not only one additional operation is performed in production, but the accuracy of the axis also when the upper lens member moves back will also affect the final quality of the product. In addition, in the process of removing and moving back the upper lens upper lens member, the adhesive material tends to be cured, thereby reducing the bonding strength.

SUMMARY

The present disclosure is intended to provide a solution that overcomes at least one of the disadvantages of the prior art.

According to one aspect of the present disclosure, there is provided an optical lens comprising:
  a first lens member including at least one first lens, the first lens member having a first optical region and a first structural region surrounding the first optical region;
  a second lens member including a second lens barrel and at least one second lens mounted in the second lens barrel, the at least one second lens and the at least one first lens together forming an imaging optical system, the second lens member having a second optical region and a second structural region surrounding the second optical region, the second structural region having a second top surface and the second top surface having a groove; and
  a first adhesive located in a first gap between the first lens member and the second lens member, the first adhesive being accommodated in the groove, and the first adhesive supporting and fixing the first lens member and the second lens member after curing;
  wherein the first adhesive flows in the groove when uncured.

Herein, the first adhesive is positioned between the first structural region and the second structural region such that a relative position of the first lens member and the second lens member is maintained at the relative position determined by active calibration.

Herein, the first lens member is sized and shaped such that at least one portion of the groove is not covered by the first lens member when the first lens member and the second lens member are maintained at the relative positions determined by active calibration.

Herein, the second top surface has a boss and the groove is located on the boss.

Herein, a protrusion is provided on a bottom surface of the first structural region, and the protrusion is matched with the groove.

Herein, the groove has a glue filling opening extending outwardly of the second structural region.

Herein, the groove is in the form of a closed ring or a notched ring.

Herein, the viscosity of the first adhesive is less than 500 cps.

Herein, the bonding force of the first adhesive is greater than 5 Mpa.

Herein, the color of the first adhesive is preferably black.

According to another aspect of the present disclosure, there is provided an imaging module including the optical lens according to any one of the above.

According to a further aspect of the present disclosure, there is provided an assembly method for an optical lens, including:
  pre-positioning a first lens member and a second lens member, wherein the first lens member comprises at least one first lens, the first lens member has a first optical region and a first structural region surrounding the first optical region, the second lens member comprises a second lens barrel and at least one second lens mounted in the second lens barrel, the second lens member has a second optical region and a second structural region surrounding the second optical region, the second structural region has a second top surface and the second top surface has a groove, and wherein the pre-positioning enables the at least one first lens and the at least one second lens together constitute an imaging optical system;
  determining a relative position of the first lens member and the second lens member by performing active calibration according to a measured imaging result of the imaging optical system; and bonding the first lens member and the second lens member by injecting a first adhesive into the groove to support and fix the relative position of the first lens member and the second lens member after the first adhesive is cured.

Herein, the first lens member and the second lens member are maintained at a relative position determined by active calibration when the first adhesive is injected into the groove.

According to yet another aspect of the present disclosure, there is provided an assembly method for an imaging module, including: assembling an optical lens by using the assembly method for the optical lens described in any one of the above, and manufacturing the imaging module based on the assembled optical lens.

Compared with the prior art, the present disclosure has at least one of the following technical effects:

1. The first adhesive of the present disclosure is adapted to flow in the groove of the second lens member while the first lens member and the second lens member are held in a relative positions determined by active calibration, thereby fixing the first lens member and the second lens member in the relative positions determined by active calibration.

2. The present disclosure avoids errors caused by moving the first lens member away and back due to coating of the first adhesive after active calibration, and improves the imaging quality of the optical lens.

BRIEF DESCRIPTION OF THE DRAWINGS

Exemplary embodiments are shown in reference to the accompanying drawings. The embodiments and drawings disclosed herein are to be regarded as illustrative rather than restrictive.

DETAILED DESCRIPTION OF EMBODIMENTS

Figure 1:
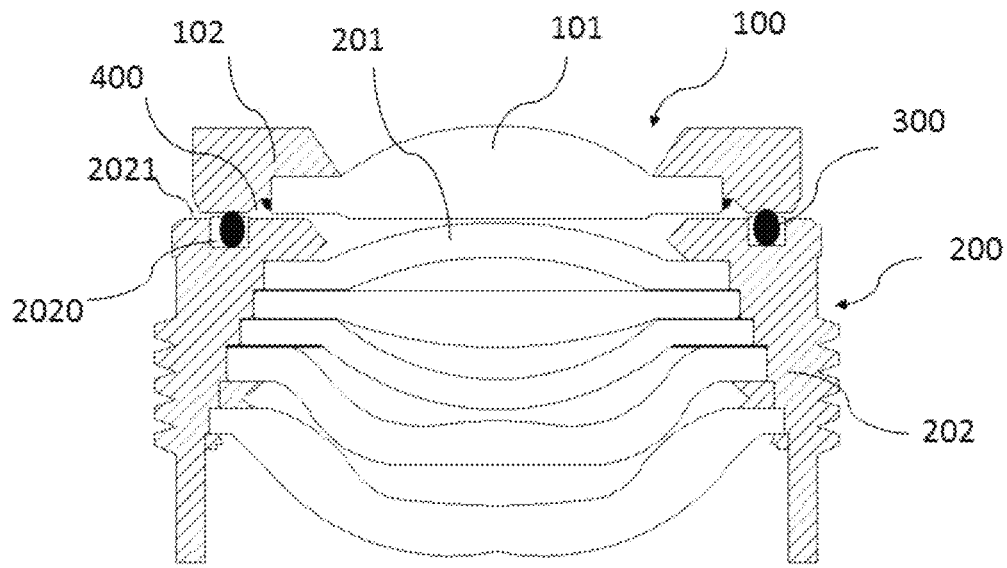
FIG. 1 shows a schematic cross-sectional view of an optical lens according to an embodiment of the present disclosure.

For a better understanding of the present disclosure, various aspects of the present disclosure will be described in more detail with reference to the accompanying drawings. It is to be understood that these detailed descriptions are merely illustrative of exemplary embodiments of the present disclosure and are not intended to limit the scope of the present disclosure in any way. Throughout the specification, like reference numerals refer to like elements. The expression "and/or" includes any and all combinations of one or more of the associated listed items.

It should be noted that, in this specification, the expressions of first, second, etc., are used solely to distinguish one feature from another feature, and do not denote any limitation on the feature. Thus, the first body discussed below may also be referred to as the second body without departing from the teachings of the present disclosure.

In the drawings, the thickness, size and shape of an object have been slightly exaggerated for ease of illustration. The drawings are by way of example only and not strictly to scale.

It is also to be understood that the terms "comprises," "comprising." "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. Furthermore, expressions such as "at least one of," when preceding a list of elements, modify the entire list of elements and do not modify the individual elements of the list. In addition, when describing the embodiments of the present application, the use of "may" means "one or more embodiments of the present application". Also, the term "exemplary" is intended to refer to an example or illustration.

As used herein, the terms "substantially," "about," and similar terms are used as terms of approximation and not as terms of degree, and are intended to account for the inherent deviations in measured or calculated values that would be recognized by those of ordinary skill in the art.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It should be noted that the embodiments in the present disclosure and the features in the embodiments may be combined with each other without conflict. The present disclosure will now be described in detail with reference to the accompanying drawings and examples.

FIG. 1 shows a schematic cross-sectional view of an optical lens according to one embodiment of the present disclosure. The section herein is a section through the optical axis of the optical lens. In this embodiment, the optical lens includes a first lens member 100, a second lens member 200, and a first adhesive 300. The first lens member 100 includes a first lens barrel 102 and a first lens 101 mounted in the first lens barrel 102. The second lens member 200 includes a second lens barrel 202 and a second lens 201 mounted in the second lens barrel 202. For example purposes, five second lenses 210 are shown in FIG. 1. However, the number of second lenses is not limited thereto. The five second lenses 201 of the second lens barrel 202 together with the first lens 101 constitute an imaging optical system. The second lens barrel 202 has a second top surface 2021, and the second top surface 2021 has a groove 2020. The first adhesive 300 is located in the first gap 400 between the first lens member 100 and the second lens member 200. The first adhesive 300 is accommodated in the groove 2020. The first adhesive 300 is suitable for supporting and fixing the first lens member 100 and the second lens member 200 after curing. In this embodiment, optionally, the first lens barrel 102 and the second lens barrel 202 are connected by the first adhesive 300 to realize the connection of the first lens member 100 and the second lens member 20. The first adhesive 300 may be adapted to support and fix the first lens barrel 102 and the second lens member 200 such that the relative positions of the first lens member 100 and the second lens member 200 are maintained at the relative positions determined by active calibration.

Further, in one embodiment, the groove is in a ring shape. For example, in a top view, the shape of the groove includes a closed ring or a notched ring.

Further, in one embodiment, the first adhesive 300 is adapted to flow in the groove when uncured.

Further, in one embodiment, the viscosity of the first adhesive 300 is less than 500 cps. When the viscosity of the first adhesive 300 is less than 500 cps, the first adhesive is adapted to flow in the groove after the first lens member 100 and the second lens member 200 are actively calibrated and held in the actively calibrated position. After the first adhesive is cured, the first lens member 100 and the second lens member 200 are fixed in the actively calibrated position.

Further, in one embodiment, the first adhesive has an adhesive force greater than 5 Mpa.

Further, in one embodiment, the color of the first glue is preferably black.

Further, in one embodiment, the first lens member 100 includes a first lens 101, and optionally the first lens 101 and the second lens barrel 202 are connected by a first adhesive 300 to realize the connection of the first lens 101 and the second lens member 200.

Figure 2:
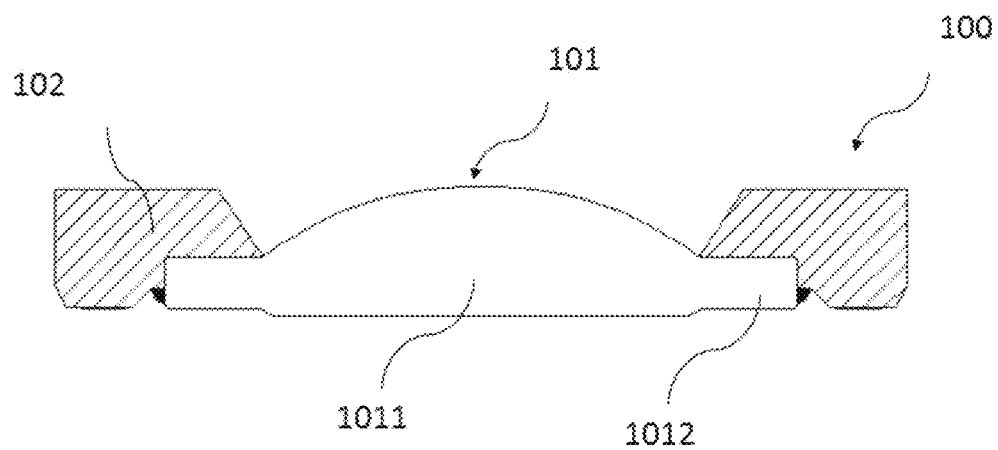
FIG. 2 shows a schematic cross-sectional view of a first lens member according to an embodiment of the present disclosure.

Further, in one embodiment, the first lens member 100 has a first optical region and a first structural region surrounding the first optical region. The first optical region is the first imaging region of the first lens 101, and the first structural region consisting of the first lens barrel 102 and the first non-imaging region of the first lens 101. FIG. 2 shows a schematic cross-sectional view of a first lens member according to an embodiment of the present disclosure. The section herein is a section through the optical axis of the first lens member. Referring to FIG. 2, the first lens 101 includes a first imaging region 1011 and a first non-imaging region 1012. The first optical region is the first imaging region 1011 of the first lens 101. The first structural region is composed of the first non-imaging region 1012 of the first lens 101 and the first lens barrel 102. The bottom surface of the first structural region is the bottom surface of the first lens barrel 102.

Further, in one embodiment, the first lens member 100 has a first optical region and a first structural region surrounding the first optical region. The first optical region is the first imaging region 1011 of the first lens 101, and the first structural region is the first non-imaging region 1012 of the first lens 101. The bottom surface of the first structural region is the bottom surface of the first non-imaging region 1012.

Figure 3:
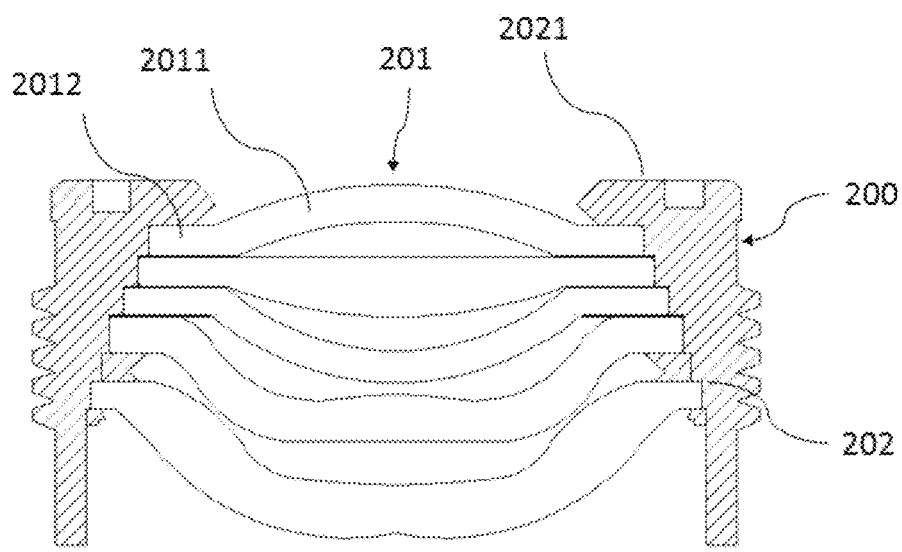
FIG. 3 shows a schematic cross-sectional view of a second lens member according to an embodiment of the present disclosure.

Further, in one embodiment, the second lens member 200 has a second optical region and a second structural region surrounding the second optical region. The second optical region is the second imaging region of the second lens 201, and the second structural region consisting of a second non-imaging region of the second lens 201 and a second lens barrel 202. The second top surface 2021 of the second lens barrel 202 is the second top surface 2021 of the second structural region. FIG. 3 shows a schematic cross-sectional view of a second lens member according to one embodiment of the present disclosure. The section herein is a section through the optical axis of the second lens member. Referring to FIG. 3, the second lens 201 includes a second imaging region 2011 and a second non-imaging region 2012. The second optical region is the second imaging region 2011 of the second lens 201, and the second structural region consists of the second non-imaging region 2012 of the second lens 201 and the second lens barrel 202.

Figure 4:
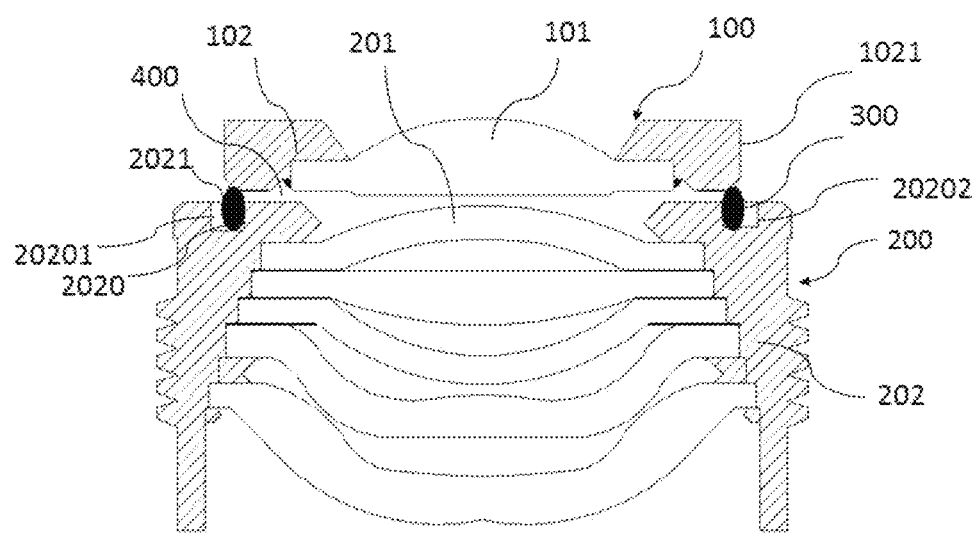
FIG. 4 shows a schematic cross-sectional view of an optical lens according to an embodiment of the present disclosure.

Further, in one embodiment, the first lens member is sized and shaped to avoid the groove after the active calibration is completed. Avoiding the groove after the active calibration is completed means that at least one portion of the groove is not covered by the first lens member when the first lens member and the second lens member are maintained at the relative positions determined by the active calibration. FIG. 4 shows a schematic cross-sectional view of an optical lens according to an embodiment of the present disclosure. The section herein is a section through the optical axis of the optical lens. Referring to FIG. 4, the groove 2020 has a groove first side 20201 and a groove second side 20202. An outer side 1021 of the first structural region is located between the groove first side 20201 and the groove second side 20202. In FIG. 4, the outer side 1021 is located between the groove first side 20201 and the groove second side 20202, so that the first adhesive 300 can be directly injected into the groove 2020 without moving the first lens member 100 or the second lens member 200 to maintain the first lens member 100 and the second lens member 200 at the relative positions determined by the active calibration after the relative positions of the first lens member 100 and the second lens member 200 are actively calibrated. In this embodiment, by reducing the overall size of the first lens member 100, the entire outer side 1021 is located between the groove first side 20201 and the groove second side 20202. In other embodiments, it is also possible to adjust only the partial size of the first lens member 100 so that at least one portion of the groove 2020 is not covered by the first lens member 100. The first adhesive 300 is injected from the part where the groove is not covered.

Figure 5:
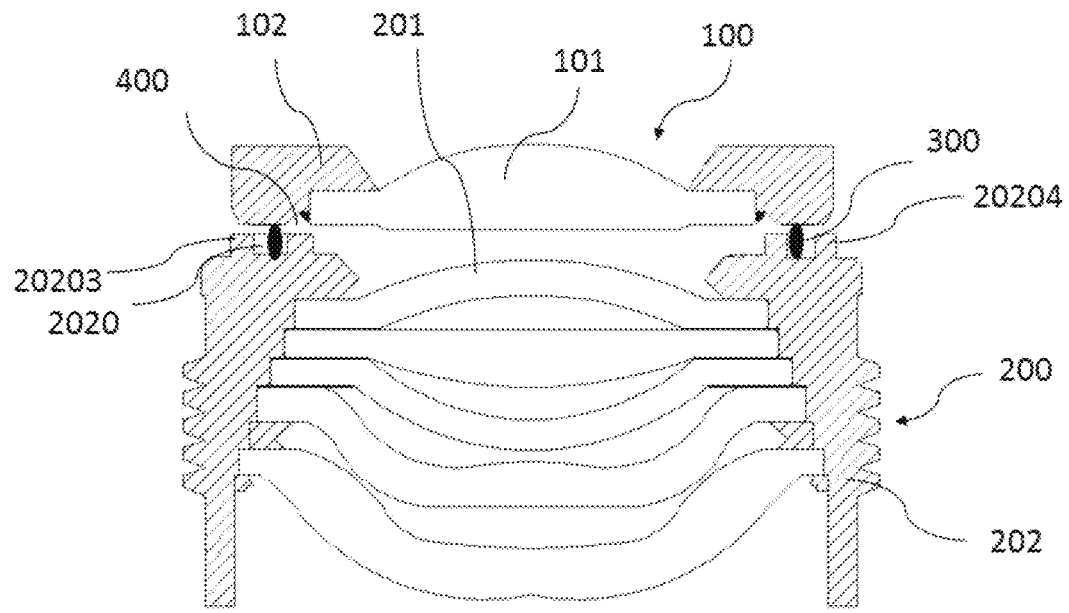
FIG. 5 shows a schematic cross-sectional view of an optical lens according to an embodiment of the present disclosure.

Further, in one embodiment, the second top surface has a boss and the groove 2020 is located in the boss. The boss has a first blocking portion and a second blocking portion, and the first adhesive 300 is located between the first blocking portion and the second blocking portion. FIG. 5 shows a schematic cross-sectional view of an optical lens according to an embodiment of the present disclosure. The section herein is a section through the optical axis of the optical lens. Referring to FIG. 5, the second top surface has a boss having a first blocking portion 20203 and a second blocking portion 20204, and the first adhesive 300 is located between the first blocking portion 20203 and the second blocking portion 20204. In FIG. 5, the first adhesive 300 is positioned between the first blocking portion 20203 and the second blocking portion 20204 so that the relative positions of the first lens member 100 and the second lens member 200 are maintained at the relative positions determined by active calibration.

Figure 6:
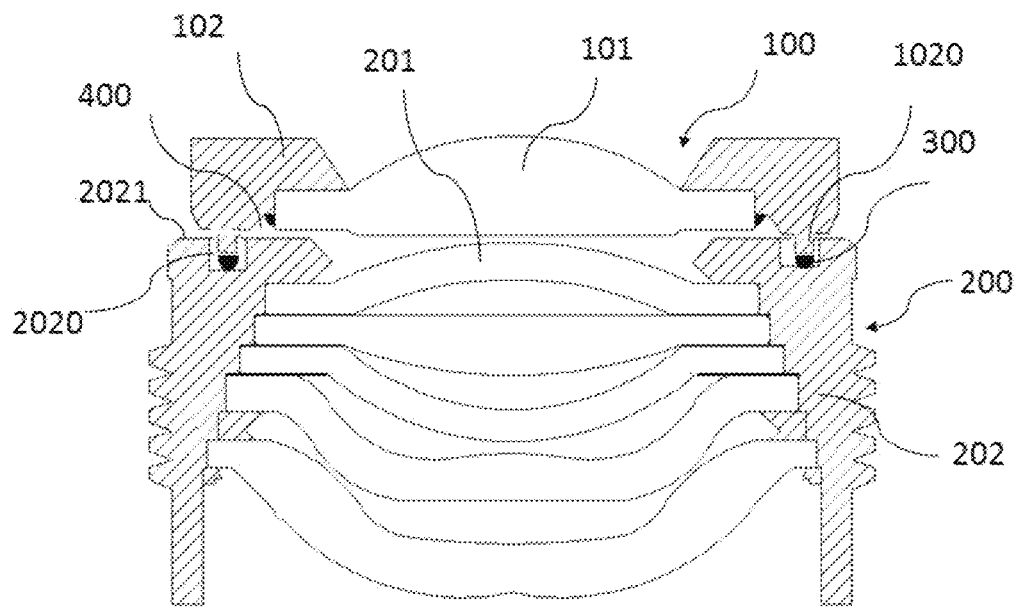
FIG. 6 shows a schematic cross-sectional view of an optical lens to be assembled according to an embodiment of the present disclosure.

Further, in one embodiment, the bottom surface of the first lens barrel 102 has a protrusion that mates with the groove. FIG. 6 shows a schematic cross-sectional view of an optical lens to be assembled according to an embodiment of the present disclosure. The section herein is a section through the optical axis of the optical lens. Referring to FIG. 6, the bottom surface of the first lens barrel 102 has a protrusion 1020 adapted to mate with the groove 2020. The first adhesive 300 is adapted to be positioned between the protrusion 1020 and the groove 2020 so as to maintain the relative positions of the first lens member 100 and the second lens member 200 at the relative positions determined by active calibration after the optical lens is assembled.

Figure 7:
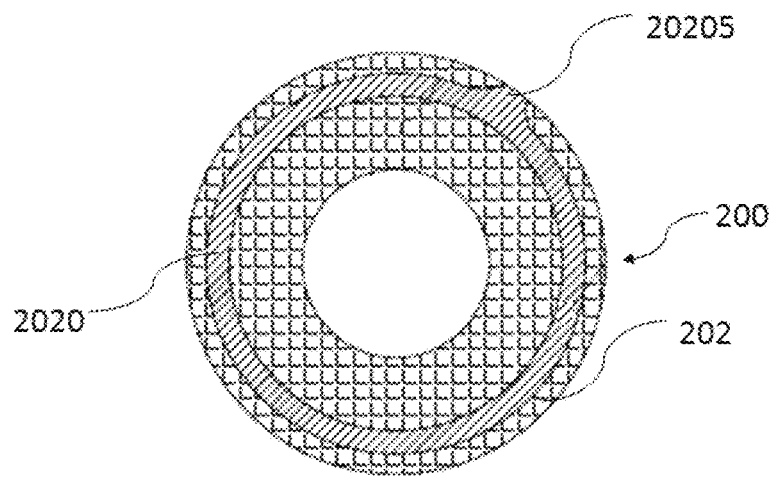
FIG. 7 shows a schematic top view of a second lens member according to an embodiment of the present disclosure.

Further, in one embodiment, the groove has a glue filling opening extending to the outside of the second lens barrel. FIG. 7 shows a schematic top view of a second lens member of an embodiment of the present disclosure. Referring to FIG. 7, the groove 2020 has a glue filling opening 20205 extending toward the outside of the second lens barrel 202. After the first lens member 100 and the second lens member 200 are actively calibrated, the first adhesive 300 can be filled into the groove 2020 through the glue filling opening 20205, so that the relative positions of the first lens member 100 and the second lens member 200 are maintained at the relative positions determined by the active calibration.

In the optical lens according to the present invention, a groove is provided on the second top surface of the second lens barrel. After the first lens member and the second lens member are actively calibrated, a first adhesive may be directly injected into the groove, and the first adhesive may flow in the groove due to capillary phenomenon, thereby realizing fixed bonding of the first lens member and the second lens member, reducing assembly errors of the optical lens, reducing the process and improving efficiency.

Further, in another embodiment of the present disclosure, an imaging module based on the above-described optical lens is also provided. The camera module includes the optical lens and a photosensitive component. The optical lens may be an optical lens in any of the preceding embodiments.

According to an embodiment of the present disclosure, there is also provided an optical lens assembly method including:

Step S10: Pre-positioning step. The first lens member 10 and the second lens member 200 are pre-positioned. The first lens member 100 includes at least one first lens 101, and the first lens member has a first optical region and a first structural region surrounding the first optical region. The second lens member 200 includes a second lens barrel 202 and at least one second lens 201 mounted in the second lens barrel 202. The second lens member 200 has a second optical region and a second structural region surrounding the second optical region. The second structural region has a second top surface 2021, and the second top surface 2021 has a groove 2020. The pre-positioning makes the at least one first lens 101 and the at least one second lens 201 together constitute an imaging optical system.

Step S20: Active calibration step. The relative positions of the first lens member 100 and the second lens member 200 are determined by performing active calibration according to measured imaging results of the optical system.

Step S30: Bonding step. By injecting the first adhesive 300 into the groove 2020, the first lens member 100 and the second lens member 200 are bonded to support and fix the relative positions of the first lens member 100 and the second lens member 200 after the first adhesive 300 is cured. There is a non-zero angle α between the axis of the first lens member 100 and the axis of the second lens member 200.

Further, in one embodiment, when the first adhesive 300 is injected into the groove 2020, the first lens member 100 and the second lens member 200 are maintained at the relative positions determined by the active calibration.

Further, in another embodiment of the present disclosure, a method of assembling an imaging module based on the above-mentioned optical lens is also provided. The assembly method of the camera module includes assembling an optical lens and a photosensitive component. The method of assembling the optical lens may be the method of assembling the optical lens in any of the foregoing embodiments.

Figure 8A:
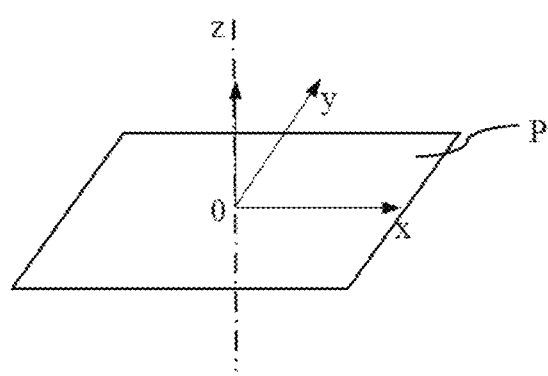
FIG. 8A shows an adjustment manner of relative position in active calibration according to an embodiment of the present disclosure.

Further, the active calibration described in the present disclosure may adjust the relative positions of the first lens member 100 and the second lens member 200 in a plurality of degrees of freedom. Active calibration refers to adjusting the position of one lens member relative to the other lens member to calibrate the entire optical system based on the measured image resolution of the optical system, so that the axis of each lens member is aligned and the measured image resolution of the optical system reaches a standard. The axis of the lens member refers to the optical axis of the optical system composed of all the lenses in the lens member. The measurement method for the image resolution of the optical system may be a TV Line test, an MTF test, or an SFR test. FIG. 8A illustrates an adjustment manner of relative position in active calibration in an embodiment of the present disclosure. In this adjustment manner, the first lens member 100 is movable in the x, y, z directions with respect to the second lens member 200 (i.e., the relative position adjustment in this embodiment has three degrees of freedom). The z direction is the direction along the optical axis, and the x and y directions are the directions perpendicular to the optical axis. Each of the x and y directions lies in an adjustment plane P in which the translation can be decomposed into two components in the x and y directions.

Figure 8B:
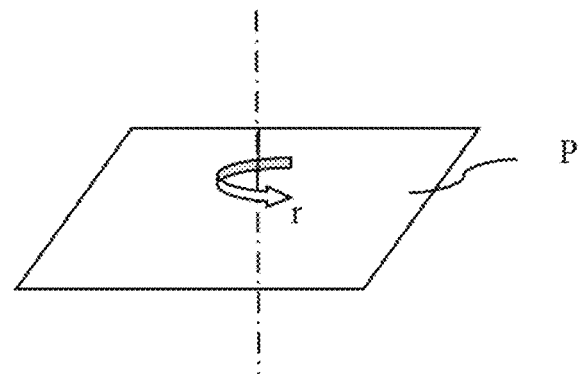
FIG. 8B shows rotation adjustment in active calibration according to another embodiment of the present disclosure.

FIG. 8B illustrates rotation adjustment in active calibration according to another embodiment of the present disclosure. In this embodiment, in addition to the three degrees of freedom of FIG. 8A, the adjustment of relative position increases the degree of freedom of rotation, i.e., the adjustment in the r direction. In the present embodiment, the adjustment in the r direction refers to a rotation in the adjustment plane P, that is, a rotation about an axis perpendicular to the adjustment plane P.

Figure 8C:
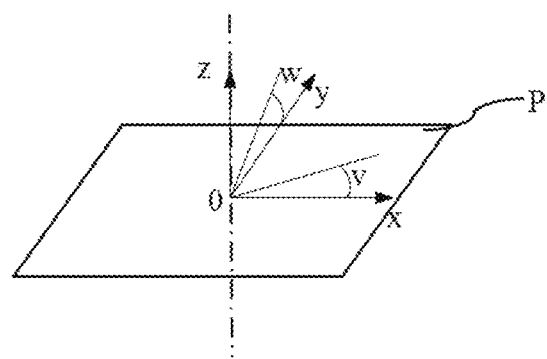
FIG. 8C shows an adjustment manner of relative position with v, w directions adjustment added in active calibration according to still another embodiment of the present disclosure.

Further, FIG. 8C shows an adjustment manner of relative position with v, w directions adjustment added in active calibration according to still another embodiment of the present disclosure. The v direction represents the rotation angle in the xoz plane, and the w direction represents the rotation angle in the yoz plane. The rotation angles in the v direction and the w direction may be combined into a vector angle, which represents the total tilt state. That is, by adjusting in the v direction and the w direction, the tilt attitude of the first lens member 100 with respect to the second lens member 200 can be adjusted (i.e., the tilt of the optical axis of the first lens member 100 with respect to the optical axis of the second lens member 200).

The adjustment of the six degrees of freedom x, y, z, r, v, w may all affect the imaging quality of the optical system (e.g., the level of the resolution). In other embodiments of the present disclosure, the adjustment manner of the relative position may refer to adjusting only any one of the six degrees of freedom described above, or a combination of any two or more thereof.

Further, in one embodiment, in the active calibration step, the movement further includes a translation on the adjustment plane, i.e. a movement in the x and y directions.

Further, in one embodiment, the active calibration further includes adjusting and determining an angle of the axis of the first lens member 100 with respect to the axis of the second lens member 200, i.e., adjustment in the w and v directions, based on the measured image resolution of the optical system. In the assembled optical lens or camera module, the angle between the axis of the first lens member 100 and the axis of the second lens member 200 may be non-zero.

Further, in one embodiment, the active calibration further includes moving the first lens member 100 in a direction perpendicular to the adjustment plane (i.e., adjustment in the z direction), and determining a relative position between the first lens member 100 and the second lens member 200 in a direction perpendicular to the adjustment plane based on a measured image resolution of the optical system.

Further, in one embodiment, in the pre-positioning step, there is a gap between the bottom surface of the first lens member 100 and the top surface of the second lens member 200.

In one embodiment, in the active calibration step, the second lens member 200 may be fixed, and the first lens member 100 is clamped by a clamp. The first lens member 100 is moved under the actuation of the six-axis motion mechanism connected to the clamp, so that the relative movement between the first lens member 100 and the second lens member 200 in the above-mentioned six degrees of freedom is realized. The clamp may bear against or partially bear against the side surface of the first lens member 100, thereby clamping the first lens member 100.

In the above embodiment, by way of example, the optical lens is described as including a first lens member and a second lens member. However, the number of lens members in the optical lens is not specifically limited, that is, the number of lens members is not limited to two, and the number of lens members may be three or four, or the like, depending on a specific design requirement.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens comprising:
    a first lens member comprising at least one first lens, the first lens member having a first optical region and a first structural region surrounding the first optical region;
    a second lens member comprising a second lens barrel and at least one second lens mounted in the second lens barrel, the at least one second lens and the at least one first lens together forming an imaging optical system, the second lens member having a second optical region and a second structural region surrounding the second optical region, the second structural region having a second top surface and the second top surface having a groove; and
    a first adhesive located in a first gap between the first lens member and the second lens member, the first adhesive being accommodated in the groove, and the first adhesive supporting and fixing the first lens member and the second lens member after curing, the groove having a glue filling opening extending toward an outside of the second lens barrel, and the first adhesive being filled into the groove through the glue filling opening;
    wherein the first adhesive flows in the groove when uncured.

2. The optical lens according to claim 1, wherein the first adhesive is positioned between the first structural region and the second structural region such that a relative position of the first lens member and the second lens member is maintained at a relative position determined by active calibration.

3. The optical lens according to claim 1, wherein the first lens member is sized and shaped such that at least one portion of the groove is not covered by the first lens member when the first lens member and the second lens member are maintained at a relative position determined by active calibration.

4. The optical lens according to claim 1, wherein the second top surface has a boss and the groove is located on the boss.

5. The optical lens according to claim 4, wherein the boss has a first blocking portion and a second blocking portion, and the first adhesive is located between the first blocking portion and the second blocking portion.

6. The optical lens according to claim 1, wherein a bottom surface of the first structural region has a protrusion which mates with the groove.

7. The optical lens according to claim 1, wherein the groove is in the form of a closed ring or a notched ring.

8. The optical lens according to claim 1, wherein the groove has a first side and a second side, and an outer side of the first structural region is located between the first side and the second side.

9. The optical lens according to claim 1, wherein the first adhesive has a viscosity of less than 500 cps.

10. The optical lens according to claim 1, wherein the first adhesive has a bonding force of greater than 5 Mpa.

11. The optical lens according to claim 1, wherein the first adhesive is black.

12. An imaging module comprising an optical lens and an optical sensor, wherein the optical lens comprises:
    a first lens member comprising at least one first lens, the first lens member having a first optical region and a first structural region surrounding the first optical region;
    a second lens member comprising a second lens barrel and at least one second lens mounted in the second lens barrel, the at least one second lens and the at least one first lens together forming an imaging optical system, the second lens member having a second optical region and a second structural region surrounding the second optical region, the second structural region having a second top surface and the second top surface having a groove; and
    a first adhesive located in a first gap between the first lens member and the second lens member, the first adhesive being accommodated in the groove, and the first adhesive supporting and fixing the first lens member and the second lens member after curing, the groove having a glue filling opening extending toward an outside of the second lens barrel, and the first adhesive being filled into the groove through the glue filling opening;

wherein the first adhesive flows in the groove when uncured.

13. An assembly method for an optical lens, comprising:
pre-positioning a first lens member and a second lens member, wherein the first lens member comprises at least one first lens, the first lens member has a first optical region and a first structural region surrounding the first optical region, the second lens member comprises a second lens barrel and at least one second lens mounted in the second lens barrel, the second lens member has a second optical region and a second structural region surrounding the second optical region, the second structural region has a second top surface and the second top surface has a groove, the groove has a glue filling opening extending toward an outside of the second lens barrel, a first adhesive is filled into the groove through the glue filling opening, and wherein the pre-positioning enables the at least one first lens and the at least one second lens together constitute an imaging optical system;

determining a relative position of the first lens member and the second lens member by performing active calibration according to a measured imaging result of the imaging optical system; and bonding the first lens member and the second lens member by injecting a first adhesive into the groove to support and fix the relative position of the first lens member and the second lens member after the first adhesive is cured.

14. The assembly method according to claim 13, wherein the first lens member and the second lens member are maintained in the relative position determined by active calibration when the first adhesive is injected into the groove.

* * * * *